(No Model.)

E. WESTON.
GALVANOMETER.

No. 392,477. Patented Nov. 6, 1888.

WITNESSES:
Gustave Dieterich
Mary Bosch

INVENTOR,
Edward Weston
BY Park Benjamin
His ATTORNEY.

N. PETERS, Photo-Lithographer, Washington, D. C.

UNITED STATES PATENT OFFICE.

EDWARD WESTON, OF NEWARK, NEW JERSEY.

GALVANOMETER.

SPECIFICATION forming part of Letters Patent No. 392,477, dated November 6, 1888.

Application filed August 17, 1888. Serial No. 282,989. (No model.)

*To all whom it may concern:*

Be it known that I, EDWARD WESTON, of Newark, Essex county, New Jersey, have invented a new and useful Improvement in Galvanometers, of which the following is a specification.

My invention relates chiefly to that class of galvanometers in which a magnet-needle is suspended between two parallel coils and combined with a mirror wherefrom a beam of light is projected upon a suitable scale.

My invention consists more particularly in the construction of the coils and their arrangement in combination with the supporting-standard, said arrangement being such that the coils may be easily applied to or removed from said standard at will without disturbing the position of the needle, and when in place are both accurately adjusted and firmly held in position.

The accompanying drawings represent my invention as applied to a reflecting-galvanometer, of which instrument sufficient is shown to make plain the relation of the invention thereto and its operation therein.

Figure 2:
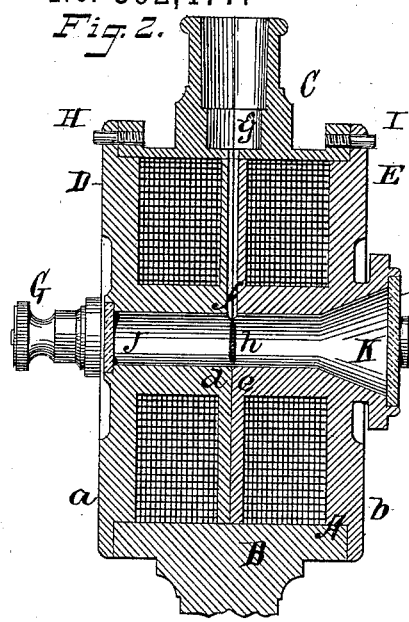
Figure 1:
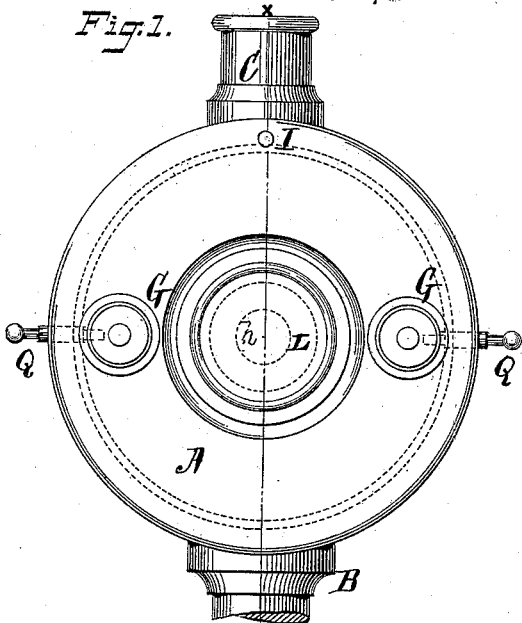
Figure 3:
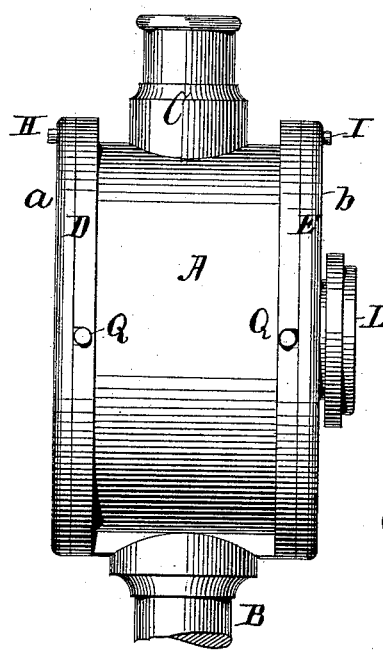
Figure 4:
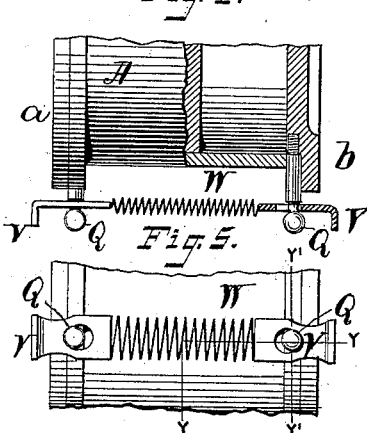
Figure 5:
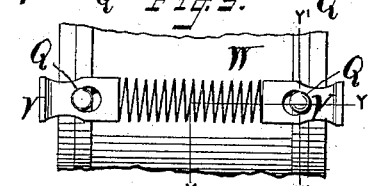
Figure 6:
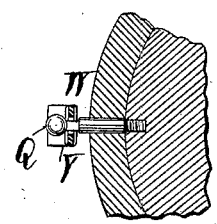
Figures 7, 8, 9, 10:
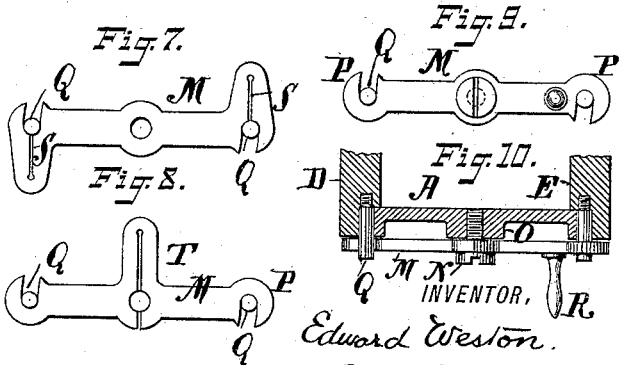

Figure 1 is a face view of the coils and their seat in the standard. Fig. 2 is a vertical section on the line $x\ x$ of Fig. 1. Fig. 3 is a side view of the cylindrical part of the standard which receives the coils. Fig. 4 is a detail view, partly in section, on the line Y Y of Fig. 5, showing a device for detachably securing the coils in the standard. Fig. 5 is a face view of said device. Fig. 6 is a sectional view of the same on the line Y' Y' of Fig. 5. Figs. 7, 8, and 9 represent various devices for the like purpose. Fig. 10 is a longitudinal section of the device shown in Fig. 9.

Similar letters of reference indicate like parts.

The standard of the instrument may be of any suitable form, as herein indicated. It embodies a ring-seat or cylindrical shell, A, which is supported upon a pillar, B, and which itself supports a tubular column, C.

D and E are spools or bobbins, upon which the coils are wound in the usual manner. The terminals of the coils are connected to suitable binding-screws, as G, Fig. 1. The spools D and E are each preferably made of a single piece of material and are of such diameter as to enter and fit nicely within the cylindrical shell or ring-seat A. The outer flanges, $a\ b$, of said spools are flanged or shouldered to rest against the outer rims of the shell A. The outer faces of the inner flanges of said spools are nicely faced, so as to make close contact when said spools are inserted in the shell A, with the shoulders of their outer flanges bearing, as already described, against the rims of said shell. In the meeting-faces of said inner flanges, D E, are made scores or channels $f$, which, when the spools are in place, form together a tubular channel, through which the filament or fiber which supports the magnet-needle passes. The spools are therefore to be placed in the ring-seat A so that the center line of the channel $f$ will coincide with and be in prolongation of the axial or center line of the hollow standard C, at the upper part of which the filament or fiber $g$, which carries the magnet-needle $h$, is secured. In order that said spools may be thus adjusted certainly, I provide upon the rims of the shell A two fixed pins, H and I, which enter openings in the flanges $a\ b$, when the spools are so placed in the shell that the center line of the channel $f$ comes in prolongation of the center line of the standard C.

The cores of the spools D and E are hollow or tubular to receive the magnet-needle $h$. The outer end of the hollow core of the spool D is closed by a piece of glass, J, or other translucent material. The outer portion of the bore in the core of spool E is flared or enlarged, as shown at K, and is closed also by a piece of glass or other translucent material, L. In this way the interior of the hollow core is protected from access of dust or air-currents, while light is admitted through the glass covers J and L, which serve as eye-pieces or through which the beam of light reflected from the needle-mirror is transmitted.

In order to secure the spools D and E in place in the shell, I may use any one of the devices represented in Figs. 4 to 10, the said devices being here shown as practical equivalents for the purpose. I prefer, however, to use the device represented in Figs. 9 and 10, which is constructed as follows: M is a bar pivoted at its center by the set-screw N to a projection, O, formed upon and on each side of the periphery of the shell A. At each extremity of the bar N are hooks P, turned in opposite directions and adapted to engage with fixed pins Q, which project from the edges of the flanges $a\ b$ of the spools D and E. These pins when the spools are in place are received in recesses in the rims of the shell A, as represented in Fig. 3. Before the spools are inserted in the shell the bar M is turned on its pivot by means of the handle R to a position vertical, or approximately so. After the pins Q have entered the recesses in the rim of shell A, the bar M is turned horizontally, so as to cause the hooks P to engage said pins, and in this way the two spools are clamped and held firmly in place. Obviously by turning said bar M, so as to release the hooks from the pins, it becomes possible to remove the spools from the shell. It will also be apparent that either or both the spools may be removed or replaced without disturbing the position of the suspended magnet.

Instead of making the bar M of the form shown in Figs. 9 and 10, I may make it of either of the shapes represented in Figs. 7 and 8. In Fig. 7 the hooks P are enlarged, and in each a slit, S, is provided, which impart to the hooks a spring action in grasping the pins Q, or, as in Fig. 8, I may leave the hooks in the form shown in Fig. 9 and enlarge the central portion of the bar, and provide therein a slit, E, communicating with the pivot-opening, whereby said bar is caused to grasp its pivot with a spring-action. The object of either of these modifications is to prevent the effects of wear either in the hooks or in the pivot, which might cause some looseness or play at these points.

The arrangement shown in Figs. 4, 5, and 6 consists of two eyelets, U, each provided at its end with a turned flange, V, for convenience in use, and connected together by a spring, W. When the spools are adjusted in place, the eyelets are simply slipped over the pins Q, and thus the coils are drawn and held firmly together in place in the shell.

In adjusting the parts together one of the spools is inserted in the shell, the suspended magnet having been adjusted in place, and then the other spool is applied and both spools are clamped in position. Finally, the instrument is leveled by any suitable means, when the center of the magnet coincides with a line drawn through the centers of the coils. Obviously thereafter either or both spools may be removed without disturbing the position of the magnet-needle.

It will be apparent that by this construction I secure the following advantages:

First. The spools carrying the coils when in place in the cylindrical shell or ring-seat A form a substantially solid compact mass, the parts of which cannot become loose or disarranged.

Second. The spools cannot be wrongly placed in the shell.

Third. When the spools are inserted so that their shoulders meet the rims of the shell and the pins I enter the openings in said shoulders, the channel $f$ necessarily is accurately centered with reference to the axial line of the standard C, and hence the center of the magnet suspended in the bore of the hollow core must coincide with a line drawn through the coil centers.

Fourth. The spools are easily applied or removed from the shell without disturbing the position of the magnet-needle.

Fifth. When the spools are in place in the shell, they are firmly held or clamped therein by a simple and convenient device.

Sixth. By means of the glass covers to the hollow core the magnet is completely protected from dust or air-currents, while its position or that of its mirror may be easily observed, or the beam of light from the mirror may be freely transmitted to the scale.

Seventh. The suspending fiber or filament is wholly inclosed in the channel $f$ and hollow standard C, and is thus protected from air-currents or mechanical injury.

Eighth. The facility of removal and application of the spools allows of spools carrying different coils being used interchangeably in the instrument, so that the apparatus may be adapted as a differential galvanometer, or coils having a different inductive ratio may be employed.

I claim—

1. In an electrical measuring-instrument, a standard having a cylindrical aperture, a magnet-needle suspended therein, two coils constructed to enter and fit within said aperture on opposite sides of said needle, said needle being received in a chamber formed in the cores of said coils, and said coils being each removable from said shell without disturbing the position of the needle therein, substantially as described.

2. In an electrical measuring-instrument, a standard having a seat or shell, two spools or bobbins carrying coils and adapted to enter said seat, and means for detachably connecting said spools one to the other, substantially as described.

3. In an electrical measuring-instrument, a standard having a seat or shell, two spools or bobbins carrying coils and adapted to enter said seat, and means for detachably connecting said spools to one another and to said standard, substantially as described.

4. In an electrical measuring-instrument, a standard having a seat or shell, two spools or bobbins carrying coils and adapted to enter said seat, and a link detachably connecting said spools to one another and supported exterior to said standard, substantially as described.

5. In an electrical measuring-instrument, a standard having a seat or shell, two spools or bobbins carrying coils and adapted to enter said seat, and a link secured upon the exterior of said shell detachably connecting said spools to one another and to said shell, substantially as described.

6. In an electrical measuring-instrument, a standard having a seat or shell, two spools or bobbins carrying coils and adapted to enter said seat, and a spring-link detachably connecting together said spools, substantially as described.

7. In an electrical measuring-instrument, the shell A, spools D E, carrying coils and provided with pins Q, and a link extending between and detachably secured to said pins, substantially as described.

8. In an electrical measuring-instrument, the shell A, spools D E, carrying coils and provided with pins Q, and the pivoted hook-link bar M, substantially as described.

9. In combination with the cylindrical shell A and spools D E, having pins Q, the link M, having hooked ends P, with slits or slots S, and adapted to engage said pins, substantially as described.

10. In combination with an electrical measuring-instrument having a standard containing a cylindrical aperture or ring-seat, spools D E, carrying coils and having tubular cores, the said cores meeting end to end when said spools are in place in said seat to form a continuous tube concentric with and extending through said seat, substantially as described.

11. In combination with an electrical measuring-instrument having a standard containing a cylindrical shell, spools D E, carrying coils and having hollow cores, each spool having on its outer flange a shoulder constructed to fit over an outer rim of said shell, and fixed pins I upon said rims adapted to enter apertures in said shoulders, substantially as described.

12. In an electrical measuring-instrument, a standard having a ring-seat or cylindrical shell, and two spools having hollow cores and carrying coils and adapted to enter said ring-seat, said spools being each provided with a radial slot, score, or groove on its inner meeting face, the said slots, scores, or grooves, when said spools are in place in said shell, coinciding longitudinally to form a channel communicating with said hollow core, substantially as described.

13. In an electrical measuring-instrument containing a magnet-needle and a suspending filament therefor, a standard containing a ring-seat or cylindrical shell, and a tubular projection above said seat, two spools, each having a hollow core and carrying a coil and adapted to enter said ring-seat, said spools being each provided with a radial slot, score, or groove on its inner meeting face, the said hollow cores when said spools are in place in said shell forming a chamber receiving said magnet-needle, and the said slots, scores, or grooves coinciding to form a channel communicating with said chamber and inclosing said suspending filament, substantially as described.

EDWARD WESTON.

Witnesses:
D. H. DRISCOLL,
PARK BENJAMIN.